(12) United States Patent
Li et al.

(10) Patent No.: US 6,858,072 B1
(45) Date of Patent: Feb. 22, 2005

(54) SURFACE-MODIFIED PEARL PIGMENT AND PROCESS FOR PRODUCING THE SAME

(75) Inventors: Bangyin Li, Fukushima-ken (JP); Katsuhisa Nitta, Fukushima-ken (JP)

(73) Assignee: Merck Patent GmbH, Darmstadt (DE)

( * ) Notice: Subject to any disclaimer, the term of this patent is extended or adjusted under 35 U.S.C. 154(b) by 233 days.

(21) Appl. No.: 10/203,431

(22) PCT Filed: Jan. 31, 2001

(86) PCT No.: PCT/EP01/00999

§ 371 (c)(1),
(2), (4) Date: Aug. 8, 2002

(87) PCT Pub. No.: WO01/59014

PCT Pub. Date: Aug. 16, 2001

(30) Foreign Application Priority Data

Feb. 10, 2000 (EP) .......................................... 2000-033129

(51) Int. Cl.[7] .................................................. C09G 1/00
(52) U.S. Cl. ........................ 106/415; 106/416; 106/417; 106/418; 106/415
(58) Field of Search ................................. 106/415, 416, 106/417, 418, 426, 428, 429, 430, 436, 438, 439, 442, 444, 447

(56) References Cited

U.S. PATENT DOCUMENTS 5,223,034 A * 6/1993 Nitta et al. .................. 106/417
5,423,912 A * 6/1995 Sullivan et al. ............. 106/417

FOREIGN PATENT DOCUMENTS

JP        09048707     * 2/1997

* cited by examiner

Primary Examiner—C. Melissa Koslow
Assistant Examiner—Shalie Manlove
(74) Attorney, Agent, or Firm—Millen, White, Zelano, Branigan, P.C.

(57) ABSTRACT

This invention provides a highly orientated surface-modified pearl pigment excellent in plane orientation (leafing effect). Disclosed are: a surface-modified pearl pigment wherein fine polymer particles adhere, without being mutually aggregated, to hydrated metal oxides via chemical bonding; a process for producing the same: and use thereof for inks, coatings and plastics.

16 Claims, No Drawings

SURFACE-MODIFIED PEARL PIGMENT AND PROCESS FOR PRODUCING THE SAME

TECHNICAL FIELD

The present invention relates to a highly brilliant coloristic pearl pigment excellent in plane: orientation (leafing effect).

BACKGROUND OF THE INVENTION

Pearl pigments are used widely as one of color materials in various fields such as inks, coatings, plastics and cosmetics etc. These pearl pigments are prepared by covering a flaky substrate thereon with a transparent or semitransparent metal oxide having high refractive index so as to emit the interference color from mutual interfering action between reflection of incident light from the interface of a flaky substrate/covering layer and reflection of incident light from the surface of the covering layer. Because these pearl pigments are composed essentially of inorganic compounds, they have high polarity and there appears the problem of poor affinity to organic media.

Accordingly, in order to improve their affinity to organic media and anti-yellowing property, pearl pigments treated with various methods have been proposed (e.g., JP-A 63-130673, JP-A 1-292067, JA-A 4-296371, JA-A 5-171058, JA-A 6-16964 and JP-A 9-48930). However, these treatments are concerned about offering only the improvement of the affinity of the flaky pearl pigment to organic media, the orientation of the flaky pearl pigment readily becomes random in the medium and the flaky pearl pigments is just uniformly dispersed in the medium, so the original characteristics resulting from the shape of the flaky pearl pigment cannot be sufficiently demonstrated. That is, it is impossible to arrange the flaky particle plane of the flaky pearl pigment to parallel to a printed surface or a coated surface (hereinafter, this arrangement is referred to as "plane orientation") in order to achieve the maximal original effect of the coloristic property of the pigment. By improving or devising mechanical methods such as the method of printing, coating or plastics moulding etc, the probability of plane orientation is increased to a certain degree but this is still insufficient to achieve the adequate effect. Accordingly, there remains a great need in the market for higher demonstration of characteristics originating in the shape of the current pearl pigment (hereinafter, the improvement of coloration etc. by plane orientation is referred to as "leafing effect").

The technical problem for this need requires a technique balancing delicately both the effect of affinity to a medium and the effect of floating on the surface of the medium, to prevent flaky pearl pigments from being mutually aggregated in an organic medium, and simultaneously to float the pigments to be as parallel as possible on the surface of the medium without dispersing them into the inside of the medium.

On the other hand, JP-A 9-48707 discloses that the flaky pearl pigment coated thereon with spherical fine particles of acrylic resin belonging to fine particles of ethylenically unsaturated carboxylic acid-type resin achieves natural flesh color finishing due to diffused reflection of reflected light from the surface of the pearl pigment when used as makeup cosmetics.

In view of the description therein "Paying attention to the excellent optical characteristics of the pearl pigment, the intensity of uniformed and, diffused reflection light can be arbitrarily controlled by covering its strong glossiness in the specular direction with spherical fine powder of acrylic resin . . . ", this prior art is directed to the improvement (halation effect) of optical characteristics for mere use in cosmetics, and such a pearl pigment cannot be expected to exhibit the leafing effect. In fact, it is disclosed therein that the ratio by weight of the spherical fine particles of acrylic resin to the flaky pearl pigment shall be in the range of 60/40 to 40/60, and thus its surface is coated with a very large amount of fine particles of acrylic resin, and it is absolutely impossible to exhibit the leafing effect.

Further, in view of the process for producing the same, it is described therein that a pearl pigment and spherical fine powder of acrylic res in are mixed at a certain ratio, formed into slurry in aqueous alcohol and spray-dried at 70 to 100° C. thereby permitting the acrylic resin to adhere to the surf ace of the pigment to give the desired product, but according to this process, the spherical fine powder of acrylic resin may be dissolved and deformed owing to use of the alcohol, and thus it is not necessarily possible to permit the spherical fine powder of acrylic resin, while maintaining the spherical shape, to adhere to the surface of the pigment. Further, because the coating method is merely due to the method of spray-drying, its adsorption is based on physical adsorption and the adhesion force is weak, thus causing the acrylic resin powder to be exfoliated in some cases depending on the conditions to be done later (conditions for mixing in other media).

DISCLOSURE OF THE INVENTION

The object of the present invention is to provide a novel surface-modified pearl pigment having affinity to an organic medium and exhibiting high plane orientation in the surf ace of the medium so as to solve the problem in the prior art as described above.

As a result of their eager study for solving the problem described above, the present inventors found a novel surface-modified pearl pigment.

Accordingly, the present invention relates to, a surface-modified pearl pigment, wherein a hydrated metal oxide is covered on the surf ace of a pearl pigment, and fine polymer particles, chemically bonded to a hydrated metal oxide-coated pearl pigment without being mutually aggregated, are adhered to the surface of the outmost layer of said hydrated metal oxide-coated pearl pigment.

Further, the present invention relates to the surf ace-modified pearl pigment described above wherein the fine polymer particles are fine particles of colloidal ethylenically unsaturated carboxylic acid-type resin.

Also, the present invention relates to the surface-modified pearl pigment described above wherein the hydrated metal oxide is a hydrated metal oxide comprising a metal selected from aluminum, zinc, calcium, magnesium, zirconium and cerium, and the amount thereof, in terms of metal oxide, is 0.1 to 20% by weight of the pearl pigment.

And also, the present invention relates to the surface-modified pearl pigment described above wherein the average particle diameter of the fine polymer particles is 1000 nm or less, and the weight average molecular weight thereof is 10,000 to 3,000,000, and the fine polymer particles are allowed to adhere, in the range of 0.1 to 20% by weight, to 100 parts of the pearl pigment coated with a hydrated metal oxide.

In addition, the present invention relates to the surface-modified pearl pigment described above wherein the component of the fine polymer particles comprises at least ethylenically unsaturated carboxylic acids (salts) or carboxylates as a monomer component and is a homopolymer of these monomers or a copolymer obtained by combination with other ethylenically unsaturated monomers.

Furthermore, the present invention relates to a process for producing a surface-modified pearl pigment, comprising:
1) the step of preparing an aqueous suspension of a pearl pigment,
2) the step of adding an aqueous solution of a metal salt and an aqueous alkaline solution to said aqueous suspension to coat the pearl pigment with a hydrated metal oxide, to prepare a hydrated metal oxide-coated pearl pigment,
3) the step of further adding an aqueous suspension containing the hydrated metal oxide-coated pearl pigment to a suspension containing fine polymer particles or adding a suspension containing fine polymer particles to an aqueous suspension containing the hydrated metal oxide-coated pearl pigment, to allow the fine polymer particles to adhere to the surface of the outermost layer of the hydrated metal oxide-coated pearl pigment.

Finally, the present invention relates to use of the pearl pigment for inks, paints or plastics.

BEST MODE FOR CARRYING OUT THE INVENTION

Hereinafter, the mode for carrying out the present invention is described.

The pearl pigment used in the present invention may be publicly known one, and typical examples include products obtained by coating e.g. the surface of mica as the substrate with a metal oxide such as titanium oxide or iron oxide etc. Other flaky substrates which can be used in the present invention include basic lead carbonate, bismuth oxychloride, graphite flake, aluminum flake, alumina flake, silica flake, glass flakes etc. Besides those described above, colored metal oxides such as cobalt oxide and cobalt titanate used not only for expressing a mere interference color but also for other functions such as weatherability, light resistance and further for conferring mass tone (color) can be used or jointly used as metal oxides with which the flaky substrates described above are coated thereon.

These various metal oxides can be easily coated by known techniques using a wet process (neutralization hydrolysis, thermal hydrolysis etc.) or by a sol-gel process. Those produced substance in this manner can be easily commercially available.

The color (mass tone) of the metal oxide itself is overlaid with a interference color emitted by the interfering action between the information of the coating metal oxide and the coated interface, thus emitting various colors or colorless pearl-like glossiness depending on the type of metal oxide coated on the surface of the flaky substrate. The basic tone of color in the present invention is determined by selecting these pearl pigments.

The metal salt as the starting material for preparing the hydrated metal oxide coated on the pearl pigment used in the present invention is used for metal salt bonding (detailed below) to the fine polymer particles described below, and a at least divalent metal salt is used in order to satisfy its binding powder in a minimum amount, and hydrochlorides, sulfates, acetates, oxychlorides of particularly aluminum, zinc, calcium, magnesium, zirconium and cerium are used because these are easily available in the market. It is more preferable that highly water-sol-able salts, particularly those with metals such as aluminum, zinc, calcium and magnesium applicable became of addition in the form of an aqueous solution, and zirconium, cerium etc. are applicable for use in a field where performance such as weatherability is required for the pigment. Further, these metal salts can also be used in the combined system.

The amount of the metal salt for forming the hydrated metal oxide used in the present invention, in terms of metal oxide, is selected in the range of 0.1 to 20% by weight. This hydrated metal oxide acts as a binder for coating with fine polymer particles in the later step, and accordingly, its amount is satisfactory insofar as a single layer of the hydrated metal oxide is formed on the surface of the pearl pigment as the substrate. This amount shall be determined in consideration of the change of its basic tone of color (hue, chroma and glossiness), coagulation of the pigment particles etc., and as the unit surface area of the pearl pigment substrate used is increased, the metal salt shall be used in a larger amount, while as the unit surface area is decreased, a lower amount suffices. For example, it is recommended that when mica titanium having an average particle size of about 12 $\mu$m (referring herein to a pigment having flaky mica coated with titanium oxide) is used, the amount is not more than 10% by weight, preferably not more than 5% by weight.

The pearl pigment can be coated with the hydrated metal oxide used in the present invention by a usual wet process such as neutralization hydrolysis, thermal hydrolysis or a sol-gel process, or by a dry process such as the CVD method. Among these, the wet process is preferable in respect of its ability to form a uniform coating and for the treatment in a post-step in the present invention. Further, the neutralization hydrolysis is more preferable for the control of hydrolysis reaction. That is, a suspension of the pearl pigment is prepared, and as a binder (for binding) in this suspension, an aqueous solution of a metal salt is added dropwise thereto at a pH value kept higher than the hydrolysis neutralization point of the metal salt, to form a desired hydrated metal oxide covered on the surface of pearl pigment.

Then, the suspension containing the resulting hydrated metal oxide-coated pearl pigment is washed with water and filtered. This step of washing with water is conducted; to remove free inorganic salts formed by hydrolysis. This should be conducted sufficiently because remaining free inorganic salts will adversely affect the coating step of fine polymer particles to be added in the later step. That is, if the free salts are present in a large amount, the fine polymer particles are aggregated or broken to cause the problem of heterogeneous adhesion. The method of removing the free salts is not limited to the method of filtration and subsequent washing with water as described above, and decantation can also be used.

The resultant pearl pigment solids coated with the hydrated metal oxide are added to water to prepare a suspension again, and the suspension is adjusted with an acidic aqueous solution to a pH value of less than the neutralization point of the hydrated metal oxide. This is to form metal ions, oxycations, hydroxycations etc. (hereinafter referred to as "active site") on the surface of the hydrated metal oxide coated on the surface of the pigment (this is referred to hereinafter as "activated treatment"). In this step, the pH is dropped preferably in the range of 0.2 to 3.0 from the neutralization point of the metal cation.

This drop in pH is determined preferably within the range in which the once coated hydrated metal oxide is not dissolved, but a larger drop in pH is preferable for efficiency of production because the active site is formed in a shorter time. However, if this rapid dissolution occurs easily due to the metal species and the size of the coated hydrated metal oxide, the extent of this drop in pH should be small. Anyway, this drop in pH can be practically selected within the range described above, depending on the time required for addition of fine polymer particles and the time of other operational steps.

The resultant pigment is further coated with fine polymer particles. For this, any of the following methods can be used: the method (A)

of adding the above suspension with a pH value reduced to less than the neutralization hydrolysis point (referred to as "activated suspension") to a suspension of fine polymer particles and the method (B)

of adding a suspension of fine polymer particles to the activated suspension. In both the methods, this addition should be conducted under the conditions where fine polymer particles are not mutually aggregated. As a coating method under the conditions where fine polymer particles are not mutually aggregated, particularly the method (A) is more preferable. However, even in the method (B), excellent coating is feasible using a colloidal stabilizer for the conditions where fine polymer particles are not mutually aggregated.

The fine polymer particles used in the present invention mean natural or synthetic fine polymer particles, and in particular fine polymer particles composed of a monomer component having a carboxylic acid group are used. Typical examples are fine polymer particles of colloidal ethylenically unsaturated carboxylic acid-type resin having carboxylic acid groups such as acrylic acid, methacrylic acid, itaconic acid, (anhydrous) maleic acid, fumaric acid and crotonic acid, and fine polymer particles of aromatic carboxylic acid-type resin can also be used.

These carboxylic acid groups play a role in binding via salt bonds to the previously coated layer of the hydrated metal oxide having active sites. Accordingly, any monomers having acid functional groups can be used, and these are not necessarily present in the form of acid before use, and those easily hydrolyzed to form acid functional groups in an actual situation for use, for example those in the form of various esters and metal salts can also be used.

Other monomer components constituting fine particles of colloidal ethylenically unsaturated carboxylic acid-based resin include monomers having ethylenically unsaturated bonds, for example various kinds of ethylenically unsaturated carboxylates (salts, esters), various kinds of ethylenically unsaturated carboxylic acid amides and nitriles, various kinds of alkenes such as ethylene, styrene, α-methylstyrene, vinyl toluene, propylene and butylene, conjugated dienes such as butadiene, chloroprene and isoprene, and vinyl chloride, vinylidene chloride and vinyl acetate. The ethylenically unsaturated carboxylate includes methyl acrylate, ethyl acrylate, n-propyl acrylate, i-propyl acrylate, butyl acrylate, or these types of methacrylates, and oxyethyl phosphate of (meth) acrylic acid, oxypropyl phosphate of (meth)acrylic acid, and a hydroxyethyl ammonium salt with oxyethyl phosphate of (meth) acrylic acid.

The fine particles of colloidal ethylenically unsaturated carboxylic acid-type resin used in the present invention are made of copolymers of those enumerated above with ethylenically unsaturated carboxylic acid monomers or homopolymers of ethylenically unsaturated carboxylic acid monomers.

The process for polymerization thereof can make use of emulsion polymerization, suspension polymerization etc. among which emulsion polymerization is particularly used to make fine particles having the desired size in the present invention. Emulsion polymerization is very preferred because uniform particles with smaller particle diameters in a narrow range of the distribution of particle diameters can be easily obtained. The fine polymer particles used in the present invention have an average particle diameter in the range of 1000 nm or less. These particles are preferably in the range of 500 nm or less, more preferably 150 nm or less.

As the average particle diameter is increased, the adhesion of the fine particles to the hydrated metal oxide-coated pearl pigment tends to be decreased and the amount of the fine particles for achieving the desired performance tendency to be increased, and thus the average particle diameter shall be selected depending on the size of the substrate particles to be coated, while considering an economical aspect. Further, because the coloration of the surface-modified pearl pigment of the present invention is also affected, these particles are preferably those having a smaller diameter in the range described above. Further, those having a weight average molecular weight in the range of 10,000 to 3,000,000 are used.

The fine polymer particles with the average particle diameter and the weight average molecular weight described above can be obtained by suitably selecting the type and amount of an emulsifier, the type and amount of an polymerization initiator and the type and amount of a chain transfer agent as well as the reaction time and reaction temperature. Further, these fine polymer particles can be easily obtained on the market, and for example, "AE series" produced by JSR and "Nipol series" produced by Nippon Zeon Co., Ltd. can be used. The solid content of fine particles of colloidal ethylenically unsaturated carboxylic acid-type resin in these products is 10 to 70% by weight.

The amount of the fine polymer particles used in the present invention is determined in consideration of the balance between the improvement of plane orientation as the object of the present invention and the affinity to media in various utilities, and for example, the amount of the fine polymer particles is 0.1 to 20% by weight relative to the pearl pigment as the substrate. That is, the amount of the fine polymer particles can be suitably determined in this range, depending on the balance between properties such as polarity, hydrophilicity, lipophilicity etc. resulting from the selection and combination of monomers constituting fine polymer particles, the degree of polymerization, the particle diameter and the physical properties of the hydrated metal oxide-coated pearl pigment.

A suspension of the hydrated metal oxide-coated pearl pigment having the fine polymer particles coated thereon is obtained in this manner, then washed with water, filtered and dried whereby the surface-modified pearl pigment of the present invention can be obtained. The temperature and time for this drying are for simply removing water, and the upper limit thereof shall be below the thermostable temperature of the organic materials constituting the fine polymer particles. Usually, about 105° C. is adopted. Accordingly, the "hydrated metal oxide" in the present specification is obtained by drying of the metal hydrolyzate and refers to a mixture of a metal hydroxide and a metal oxide.

If the surface-modified pearl pigment according to the present invention is used in inks, paints, plastics or cosmetics, the surface-modified pearl occurs while floating preferentially in the surface of the media thereof (organic solvents for usual inks, paints, plastics and cosmetics, specifically e.g. various kinds of polyester acrylate resins, various kinds of polyurethane acrylates, various kinds: of polyether acrylates, acrylic melamine resins, various kinds of aromatic solvents, natural fats and oils), and as a result, there occurs plane orientation to improve coloration as the pearl pigment. Accordingly, the surface-modified pearl pigment according to the present invention can be used in printing inks for gravure printing, pad printing, offset printing, screen printing etc., paints for automobiles, building walls etc., light-reflective paints for liquid crystal displays, paints: for light semipermeable membranes, materials kneaded in various kinds of plastic bottles and color materials for cosmetics. When the pearl pigment according to the invention is used in printing inks, they are preferably mixed with spherical particles, which have the function to break up existing pigment agglomerates, by action of the spherical particles being pressed into the accumulations of pigment in the course of the printing operation and causing these composite agglomerate structures to disintegrate. In the process, some of the larger spherical particles may be destroyed. Preferably, in the final print, the only particles remaining are those having a relatively small particle diameter, whereas the fragment pieces exert a loosening effect within the composite pigment structure. Suitable spherical particles are, in particular, hollow spheres of glass, wax, polymers such as vinyl resins, nylon, silicone, epoxy polymers such as vinyl polystyrenes, and inorganic materials, for example $TiO_2$, $SiO_2$ or $ZrO_2$. It is preferred to use hollow spheres, although solid spheres may also be used. The spheres preferably have a particle size of from 0.05 to 150 μm. In the pigment preparation according to the invention, it is particularly preferred to employ hollow spheres of glass, wax or polymer. The spherical particles preferably have a particle size of 0.05–150 μm. Spherical particles based on $SiO_2$ in a particle range of 3–10 μm are known, for example, as materials for high-pressure liquid chromatography and are marketed, for example, as LiChrospher by Merck, Darmstadt. Such materials are preferably employed in monodisperse form, i.e. with as uniform as possible a particle size. Monodisperse spherical particles of this kind are known which are based on $SiO_2$, $TiO_2$ and $ZrO_2$. Monodisperse $SiO_2$, for example, can be prepared in accordance with DE 36 16 133. Hollow glass spheres are marketed, for example, under the trade name Q-CEL by PQ Corporation, USA, or Scotchlite by 3M, Frankfurt, FRG.

The improved deagglomeration of the luster pigments in a printing ink is evident even with small quantities of spherical particles in the pigment composition. For instance, even when using luster pigments having a content of 0.5% by weight of spherical particles, based on the dry pigment, significantly improved print-run properties are found in printing inks which contain the pigment composition according to the invention. In general, luster pigment having a content of preferably 1–10% by weight, in particular 1–5% by weight, of spherical particles are preferred for use in the printing ink.

Additionally the pearl pigments according to the invention can be mixed with organic or inorganic pigments dyes and/or luster pigments in order, for example to achieve specific color effects.

The luster pigment used preferably comprises commercial metallic pigments, such as platelet-shaped iron oxide, aluminum flakes, e.g., Standart® from Eckart, special-effect pigments, e.g., Paliochrom® from BASF, and pearl luster pigments—mica flake pigments coated with metal oxides—which are obtainable, for example, from Merck, Darmstadt under the trade name Iriodin®.

Hereinafter, specific examples are described but the present invention is not limited thereto.

Example 1

100 g pearl pigment (Iriodin 223 with an average particle diameter of 12 μm, Merck Japan) was suspended in 2L deionized water and heated to about 75° C. under stirring. The pH value of the suspension was adjusted to 5.8 with 20% by weight of aqueous hydrochloric acid solution. Then, 130 g of 5.6% by weight of aqueous aluminum chloride hexahychate solution was added to it at a feed rate of 2 ml/min, while the pH was kept at 5.8 with 32% by weight of aqueous sodium hydroxide solution. After the addition was finished, the mixture was kept for 1 hour with stirring, then filtered and washed with water, and the obtained solids were dried. The dried solids were suspended again in 2 L deionized water, and the temperature of the suspension was kept to 35° C. under stirring. The pH of the suspension was adjusted to 4.8 (drop from the neutralization point: 0.4) to prepare an activated suspension. Separately, 27 g suspension of fine particles of colloidal acrylic resin ("AE120" with a solid content of 36% by weight and an average particle diameter of 70 nm, JSR) was diluted with 2 L deionized water, and the pH was adjusted to 4.8, and the previously prepared activated suspension was added at a feed rate of about 80 ml/min to this diluted suspension of fine particles of colloidal acrylic resin. After this addition was finished, the mixture was kept for 1 hour with stirring, then filtered, washed with water and dried, the surface-modified pearl pigment of the present invention was obtained. Measurement of this product by TG/DTA indicated that, the amount of the fine particles of colloidal acrylic resin adhered to the hydrated metal oxide-coated pearl pigment was 2.9% by weight relative to said pearl pigment.

Example 2

The surface-modified pearl pigment was obtained under the same conditions as in Example 1 except that the activated treatment was not performed. Measurement of this product by TG/DTA indicated that the amount of the fine particles of colloidal acrylic resin adhered to the hydrated metal oxide-coated pearl pigment was 2.0% by weight relative to said pearl pigment.

Example 3

The surface-modified pearl pigment was prepared under the same conditions as in Example 1 except that the addition of the suspension was reversed, that is, the diluted suspension of the fine particles of colloidal acrylic resin was added to the activated suspension of the hydrated method oxide-coated pearl pigment. Measurement of this product by TG/DTA indicated that the amount of the fine particles of colloidal acrylic resin adhered to the hydrated metal oxide-coated pearl pigment was 3.0% by weight relative to said pearl pigment.

Comparative Example 1

The surface-modified pearl pigment was obtained under the same conditions as in Example 1 except that the aluminum chloride salt was not used and the pH of the suspension was adjusted to 4.8. Measurement of this product by TG/DTA indicated that the amount of the fine particles of colloidal acrylic resin adhered to the hydrated metal oxide-coated pearl pigment was 1.3% by weight relative to said pearl pigment.

Evaluation of plane orientation
Evaluation method:

About 1.0 g of the surface-modified pearl pigment treated as described above or the unmodified pearl pigment was added to water or a polyurethane acrylate solution ("Aronix M-1210", Toagosei Chemical Industry Co., Ltd.), and the behavior of floating on the liquid surface was observed by visual for evaluation of hydrophobicity and oleophobicity. The samples were evaluated in five levels where the highest rank represented pigments floating on the liquid surface, excellent dispersion and plane orientation on the surface.

TABLE 1

Evaluation of plane orientation

| Sample | Plane Orientation | |
|---|---|---|
| | water | polyurethane acrylate solution |
| Example 1 | 5 | 5 |
| Example 2 | 3 | 4 |
| Example 3 | 3 | 3 |
| Comparative Example 1 | 2 | 2 |
| Untreated Iriodine 223 | 1 | 1 |

Evaluation level: from 1 (settling) to 5 (floating)

Hereinafter, the application of the surface-modified pearl pigment according to the present invention is illustrated.
1. Use in printing
(Gravure printing test)
A gravure ink with the following composition was prepared and a gravure printing test was performed by using a K printing pullfer printing machine (R.K. Print-Coat Instruments Co.,Ltd.).
Ink composition:
Sample pigment: 10 g
CCST ink medium (Toyo Ink Co., Ltd.): 20 g
Diluent (cyclohexanone): about 20 g (balance: used to adjust the viscosity to about 10 sec. with Zahn Cup No. 4)

TABLE 2

Results of printing test

| Sample | Orientation | Coloration | Gloss |
|---|---|---|---|
| Example 1 | 3 | 3 | 3 |
| Untreated Iriodine 223 | 1 | 1 | 1 |

Evaluation level: from 1 (low) to 3 (high)

Evaluation method of the printing test: The ink was printed on a black and white cover paper, and the modified pearl pigment in the ink was examined for the state of its plane arrangement orientation) on the printed surface under an optical microscope, and its coloration and gloss were also evaluated under the above 3 criteria by visual.

Formulations Examples
1. Use as a paint (for automobiles)
Composition A (acryl melamine resin):
   Acrydic 47-712 70 parts by weight
   Super Decamine G821-60 30 parts by weight
Composition B: The modified pigment obtained in the Examples
Composition C (thinner for acryl melamine resin):
   Ethyl acetate 50 parts by weight
   Toluene 30 parts by weight
   n-Butanol 10 parts by weight
   Sorbesso #150 40 parts by weight
20 parts by weight of composition B were mixed with 100 parts by weight of composition A and then diluted with composition C to adjust the mixture to have a viscosity (12 to 15 sec. by Zahn Cup #4) suitable for spraycoating, followed by spray-coated thereof to form a base coat layer.
2. use in plastics
Composition (plastic composition):
High-density polyethylene (pellet) 100 parts by weight
Modified pigment of the invention obtained in the Examples 1 part by weight
Magnesium stearate 0.1 part by weight
Zinc stearate 0.1 part by weight
Pellets compounded at the ratio described above were dry-blended and injection-molded.

What is claimed is:

1. A surface-modified pearl pigment, wherein a hydrated metal oxide is covered on the surface of a pearl pigment, and fine polymer particles, chemically bonded to a hydrated metal oxide-coated pearl pigment without being mutually aggregated, are adhered to the surface of the outmost layer of said hydrated metal oxide-coated pearl pigment.

2. The surface-modified pearl pigment according to claim 1, wherein the fine polymer particles are fine particles of colloidal ethylenically unsaturated carboxylic acid-type resin.

3. The surface-modified pearl pigment according to claim 1, wherein the hydrated metal oxide is a hydrated metal oxide comprising a metal selected from aluminum, zinc, calcium, magnesium, zirconium and cerium, and the amount thereof, in terms of metal oxide, is 0.1 to 20% by weight of the pearl pigment.

4. The surface-modified pearl pigment according to: claim 1, wherein the average particle diameter of the fine polymer particles is 1000 nm or less, and the weight average molecular weight thereof is 10,000 to 3,00,000, and the fine polymer particles are allowed to adhere, in the range of 0.1 to 20% by weight, to 100 parts of the pearl pigment coated with a hydrated metal oxide.

5. The surface-modified pearl pigment according to claim 1, wherein the component of the fine polymer particles comprises at least ethylenically unsaturated caboxylic acids (salts) or carboxylates as a monomer component and is a homopolymer of these monomers or a copolymer obtained by combination with other ethylenically unsaturated monomers.

6. A process for producing a surface-modified pearl pigment, comprising:
1) the step of preparing an aqueous suspension of a pearl pigment,
2) the step of adding an aqueous solution of a metal salt and an aqueous alkaline solution to said aqueous suspension to coat the pearl pigment with a hydrated metal oxide, to prepare a hydrated metal oxide-coated pearl pigment,
3) the step of further adding an aqueous suspension containing the hydrated metal oxide-coated pear pigment to a suspension containing fine polymer particles or adding a suspension containing fine polymer particles to an aqueous suspension containing the hydrated metal oxide-coated pearl pigment, to allow the fine polymer particles to adhere to the surface of the outermost layer of the hydrated metal oxide-coated pearl pigment.

7. An ink, paint or plastic composition which comprises a surface-modified pearl pigment according to claim 1.

8. An ink, paint or plastic composition which comprises a surface-modified pearl pigment according to claim 2.

9. An ink, paint or plastic composition which comprises a surface-modified pearl pigment according to claim 3.

10. The surface-modified pearl pigment according to claim 2, wherein the hydrated metal oxide is a hydrated metal oxide comprising a metal selected from aluminum, zinc, calcium, magnesium, zirconium and cerium, and the amount thereof, in terms of metal oxide, is 0.1 to 20% by weight of the pearl pigment.

11. The surface-modified pearl pigment according to claim 3, wherein the average particle diameter of the fine polymer particles is 1000 nm or less, and the weight average molecular weight thereof is 10,000 to 3,00,000, and the fine polymer particles are allowed to adhere, in the range of 0.1 to 20% by weight, to 100 parts of the pearl pigment coated with a hydrated metal oxide.

12. The surface-modified pearl pigment according to claim 3, wherein the component of the fine polymer particles comprises at least ethylenically unsaturated caboxylic acids (salts) or carboxylates as a monomer component and is a homopolymer of these monomers or a copolymer obtained by combination with other ethylenically unsaturated monomers.

13. The surface-modified pearl pigment of claim 2, wherein the colloidal ethylenically unsaturated carboxylic acid-type resin is an acrylic acid, methacrylic acid, itaconic acid, anhydrous maleic acid, fumaric acid or crotonic acid resin.

14. The surface-modified pearl pigment of claim 1, wherein the fine polymer particles have an average particle diameter of 500 nm or less.

15. The process of claim 6, wherein step 2) is conducted at a pH above the hydrolysis neutralization point of the metal salt to form a suspension of the hydrated metal oxide-coated pearl pigment, and then, before step 3):

the suspension of the hydrated metal oxide-coated pearl pigment is filtered and washed with water to remove free inorganic salts and then the resulting solid hydrated metal oxide-coated pearl pigment is suspended in water again and the suspension is adjusted to a pH below the hydrolysis neutralization point of the hydrated metal oxide.

16. The process of claim 15, wherein the pH in step 3) is 0.2 to 3.0 below the neutralization point of the hydrated metal oxide.

* * * * *

UNITED STATES PATENT AND TRADEMARK OFFICE
CERTIFICATE OF CORRECTION

PATENT NO.    : 6,858,072 B1
DATED         : February 22, 2005
INVENTOR(S)   : Bangyin Li It is certified that error appears in the above-identified patent and that said Letters Patent is hereby corrected as shown below:

Title page,
Item [75], Inventors, after the first inventor's name "Li", insert -- Iwaki -- and after the second inventor's name "Nitta", insert -- Iwaki --.
Item [30], Foreign Application Priority Data, delete "(EP)" and insert -- (JP) --

Column 10,
Line 30, after "to" please delete ":"
Line 33, please delete "3,00,000" and insert -- 3,000,000 --
Line 39, please delete "carboxylic" and insert -- carboxylic --
Line 53, please delete "pear" and insert -- pearl --

Column 11,
Line 8, please delete "3,00,000" and insert -- 3,000,000 --
Line 14, please delete "caboxylic" and insert -- carboxylic --

Signed and Sealed this

Twenty-eighth Day of June, 2005

JON W. DUDAS
*Director of the United States Patent and Trademark Office*